US009534546B2

(12) United States Patent
Nelson et al.

(10) Patent No.: US 9,534,546 B2
(45) Date of Patent: Jan. 3, 2017

(54) SYSTEM AND METHOD FOR OPERATING ENGINE

(71) Applicant: Caterpillar Inc., Peoria, IL (US)

(72) Inventors: Chad S. Nelson, Chillicothe, IL (US);
Rino Marcon, Peoria, IL (US); Kirti C. Tamhane, Dunlap, IL (US);
Hariharan Ramachandran, Dunlap, IL (US); Amina Naheed, Peoria, IL (US);
Krishna R. Yejju, Dunlap, IL (US);
Kotaro Naruo, Peoria, IL (US); Mark Bright, Pontiac, IL (US); Travis E. Barnes, Metamora, IL (US); Urvish B. Joshi, Dunlap, IL (US); Ramya Gangishetty, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 233 days.

(21) Appl. No.: 14/277,471

(22) Filed: May 14, 2014

(65) Prior Publication Data

US 2015/0330319 A1 Nov. 19, 2015

(51) Int. Cl.
*F02D 33/02* (2006.01)
*F02D 41/08* (2006.01)
*F02D 17/00* (2006.01)
*F02D 17/04* (2006.01)
*F02D 41/00* (2006.01)

(52) U.S. Cl.
CPC ............. *F02D 33/02* (2013.01); *F02D 17/00* (2013.01); *F02D 17/04* (2013.01); *F02D 41/0055* (2013.01); *F02D 41/08* (2013.01); F02D 41/008 (2013.01); F02D 2200/0414 (2013.01); Y02T 10/47 (2013.01)

(58) Field of Classification Search
CPC ............ F02D 2200/0414; F02D 41/006; F02D 2200/0402; F02D 2200/501; F02D 41/005; F02D 41/0087; F02D 41/0002; F02D 17/00; F02D 17/04
USPC .......................................... 123/319, 395, 397
See application file for complete search history.

(56) References Cited

U.S. PATENT DOCUMENTS 4,381,746 A * 5/1983 Miyagi ................. F02D 31/005
  123/179.18
4,467,601 A * 8/1984 Watanabe ............... F01N 3/023
  123/376

(Continued)

FOREIGN PATENT DOCUMENTS

FR 2980823 4/2013
JP 2005207285 8/2005

(Continued)

*Primary Examiner* — John Kwon
*Assistant Examiner* — Tea Holbrook
(74) *Attorney, Agent, or Firm* — Kevin C. Earle; Hibshman Claim Contruction PLLC (57) ABSTRACT

A method of operating an engine includes determining an intake air temperature and an engine speed. The method includes selectively initiating one of a first operating mode, a second operating mode and a third operating mode based on at least the intake air temperature and the engine speed. The first operating mode includes increasing the engine speed progressively by an incremental speed value. The second operating mode includes deactivating at least one Exhaust Gas Recirculation (EGR) cylinder of the engine. The third operating mode includes shutting down the engine.

20 Claims, 4 Drawing Sheets

(56) References Cited

U.S. PATENT DOCUMENTS

| | | | | |
|---|---|---|---|---|
| 4,483,287 A * | 11/1984 | Monigold | ............... | F02D 17/04 123/196 S |
| 4,526,140 A * | 7/1985 | Monigold | ............... | F02B 77/08 123/196 S |
| 4,756,155 A * | 7/1988 | Shinzawa | ............... | F01N 3/023 60/278 |
| 4,971,010 A * | 11/1990 | Iwata | ................ | F02D 41/0087 123/481 |
| 5,440,880 A * | 8/1995 | Ceynow | ............... | F02B 33/443 123/568.12 |
| 6,026,784 A * | 2/2000 | Weisman | ............... | B60K 31/04 123/352 |
| 6,408,831 B1 | 6/2002 | Craig et al. | | |
| 7,530,336 B2 | 5/2009 | Brecheisen, II | | |
| 8,099,222 B2 | 1/2012 | Dolker | | |
| 8,429,911 B2 | 4/2013 | Back et al. | | |
| 2001/0037780 A1* | 11/2001 | Arai | ............ | F01L 9/04 123/90.15 |
| 2002/0069011 A1* | 6/2002 | Hawkins | ............ | F02D 41/0007 701/104 |
| 2004/0216457 A1* | 11/2004 | Shea | ............ | F02B 37/12 60/608 |
| 2005/0216173 A1* | 9/2005 | Toyoshima | ............ | F02D 41/047 701/104 |
| 2005/0279323 A1* | 12/2005 | Lewis | ............ | F01L 13/0005 123/321 |
| 2006/0213483 A1* | 9/2006 | Miyachi | ............ | F02D 41/107 123/399 |
| 2007/0017482 A1* | 1/2007 | Nakashima | ............ | F02D 11/107 123/399 |
| 2008/0110426 A1* | 5/2008 | Lee | ............ | F01L 13/0005 123/90.33 |
| 2008/0271437 A1* | 11/2008 | Matsunaga | ............ | F01N 3/208 60/285 |
| 2008/0276916 A1* | 11/2008 | Sekfane | ............ | F02D 41/0055 123/568.21 |
| 2009/0150059 A1* | 6/2009 | Santoso | ............ | F02D 41/0087 701/113 |
| 2009/0299609 A1* | 12/2009 | Gokhale | ............ | F02D 35/023 701/105 |
| 2010/0037859 A1* | 2/2010 | Mashiki | ............ | F02D 35/027 123/406.33 |
| 2010/0063713 A1* | 3/2010 | Albertson | ............ | F02D 13/06 701/112 |
| 2010/0174468 A1* | 7/2010 | Surnilla | ............ | F02D 41/18 701/103 |
| 2011/0023829 A1 | 2/2011 | Miyashita | | |
| 2011/0131957 A1* | 6/2011 | Hepburn | ............ | F01N 3/021 60/278 |
| 2011/0146268 A1* | 6/2011 | Hepburn | ............ | F01N 3/021 60/602 |
| 2011/0162608 A1* | 7/2011 | Riegger | ............ | F01L 13/0005 123/90.32 |
| 2011/0239997 A1* | 10/2011 | Surnilla | ............ | F01N 3/2066 123/568.21 |
| 2012/0090585 A1* | 4/2012 | Anzawa | ............ | F02D 35/027 123/568.12 |
| 2012/0130623 A1* | 5/2012 | Ide | ............ | F02D 35/0007 701/105 |
| 2013/0008417 A1 | 1/2013 | Sankar et al. | | |
| 2013/0110374 A1* | 5/2013 | Boesch | ............ | F02N 11/0837 701/102 |
| 2013/0245867 A1* | 9/2013 | Martin | ............ | B60W 10/06 701/22 |
| 2013/0245920 A1* | 9/2013 | Vos | ............ | F02D 41/1443 701/104 |
| 2014/0033705 A1* | 2/2014 | Blythe | ............ | F02D 41/0065 60/605.2 |
| 2014/0047817 A1* | 2/2014 | Vigild | ............ | F01N 3/00 60/273 |
| 2014/0109571 A1* | 4/2014 | Primus | ............ | F02B 37/18 60/605.2 |
| 2014/0230430 A1* | 8/2014 | Krug | ............ | F02B 29/0412 60/600 |
| 2014/0260243 A1* | 9/2014 | Zhang | ............ | F02M 25/0709 60/605.2 |
| 2014/0352659 A1* | 12/2014 | Glugla | ............ | F02D 41/0087 123/350 |
| 2015/0051816 A1* | 2/2015 | Glugla | ............ | F02D 41/0055 701/108 |
| 2015/0083092 A1* | 3/2015 | Desai | ............ | F02D 41/064 123/556 |
| 2015/0101884 A1* | 4/2015 | An | ............ | F01N 13/08 181/228 |
| 2015/0128917 A1* | 5/2015 | Surnilla | ............ | F02D 41/12 123/568.16 |
| 2015/0135680 A1* | 5/2015 | Ancimer | ............ | F02D 41/027 60/274 |
| 2015/0149109 A1* | 5/2015 | Kim | ............ | G01K 7/427 702/130 |
| 2015/0275800 A1* | 10/2015 | Stenlaas | ............ | B60W 10/00 123/676 |
| 2015/0354484 A1* | 12/2015 | Zur Loye | ............ | F02D 41/0082 123/481 |

FOREIGN PATENT DOCUMENTS

| | | | | |
|---|---|---|---|---|
| JP | WO 2007083468 A1 * | 7/2007 | ............ | F02B 37/16 |
| WO | 2013175091 | 11/2013 | | |

* cited by examiner

SYSTEM AND METHOD FOR OPERATING ENGINE

TECHNICAL FIELD

The present disclosure relates to a system and a method of operating an engine.

BACKGROUND

Engines are generally used to operate various types of machines. An engine typically idles during periods when no substantial loads are applied on it, for example, when the machine is stationary. Long idle durations of the engine in cold ambient conditions may lead to ice formation in the engine. In particular, extended idle under extreme cold conditions may lead to ice formation in the intake manifold. The ice forms in the intake manifold when moisture is present. Intake manifold icing may impair combustion, leading to excessive hydrocarbon creation. This may in turn cause other problems such as valve sticking.

One attempt to control the amount of moisture that may form in the intake manifold is disclosed in U.S. Pat. No. 7,530,336 of Brecheisen II that issued on May 12, 2009 (the '336 patent). The '336 patent provides an engine intake condensation removal system that bypasses flow around a charge air cooler (CAC), and controls the amount of bypass flow to heat fluid flow from the CAC to a temperature higher than the dew point of the fluid flowing through the engine intake. Another attempt to control the amount of fluid flowing to the engine intake is disclosed in PCT Published Application No. 2013175091 A1 (the '091 publication). The '091 publication discloses an internal combustion engine including an air intake manifold, an exhaust manifold, a plurality of cylinders each having a combustion chamber, and a recirculation conduit capable of re-injecting all the exhaust gases from the combustion chamber of at least one of the cylinders, referred to as the EGR-dedicated cylinder, into the air intake manifold. The engine further includes a control system configured to temporarily inhibit combustion inside the combustion chamber of the EGR-dedicated cylinder. The invention is also related to the associated method for controlling the recirculation of gases.

Although the methods disclosed in the '336 patent and the '091 publication may help to reduce the amount of moisture that may form in the engine intake, they may still not be sufficient to account for intake icing caused by moisture reaching the intake manifold under a wide range of temperature conditions during idle operations.

The system and method of the present disclosure solves one or more problems set forth above and/or other problems in the art.

SUMMARY OF THE DISCLOSURE

In one aspect of the present disclosure, a method of operating an engine is provided. The method includes determining an intake air temperature. The method also includes determining an engine speed. The method further includes selectively initiating one of a first operating mode, a second operating mode and a third operating mode based on at least the intake air temperature and the engine speed. The first operating mode includes increasing the engine speed progressively by an incremental speed value. The second operating mode includes deactivating at least one Exhaust Gas Recirculation (EGR) cylinder of the engine. The third operating mode includes shutting down the engine.

In another aspect of the present disclosure, a method of controlling an engine is provided. The method includes determining an intake air temperature and an engine speed. The method also includes determining a first temperature parameter based on the intake air temperature. The method further includes determining a second temperature parameter based on the engine speed. The method includes initiating a first operating mode of the engine if the first temperature parameter is greater than or equal to the second temperature parameter. The method also includes initiating a second operating mode of the engine if the first temperature parameter is less than the second temperature parameter. The first operating mode includes increasing the engine speed by an incremental speed value. The second operating mode includes deactivating at least one Exhaust Gas Recirculation (EGR) cylinder of the engine.

In yet another aspect of the present disclosure, a control system of an engine is provided. The control system includes a temperature module configured to determine an intake air temperature. The control system further includes a controller communicably coupled to the temperature module. The controller is configured to selectively initiate one of a first operating mode, a second operating mode and a third operating mode based on at least the intake air temperature and an engine speed. The controller is configured to increase the engine speed progressively by an incremental speed value in the first operating mode. The controller is configured to deactivate at least one Exhaust Gas Recirculation (EGR) cylinder of the engine in the second operating mode. The controller is configured to shut down the engine in the third operating mode.

Other features and aspects of this disclosure will be apparent from the following description and the accompanying drawings.

DETAILED DESCRIPTION

Figure 1:
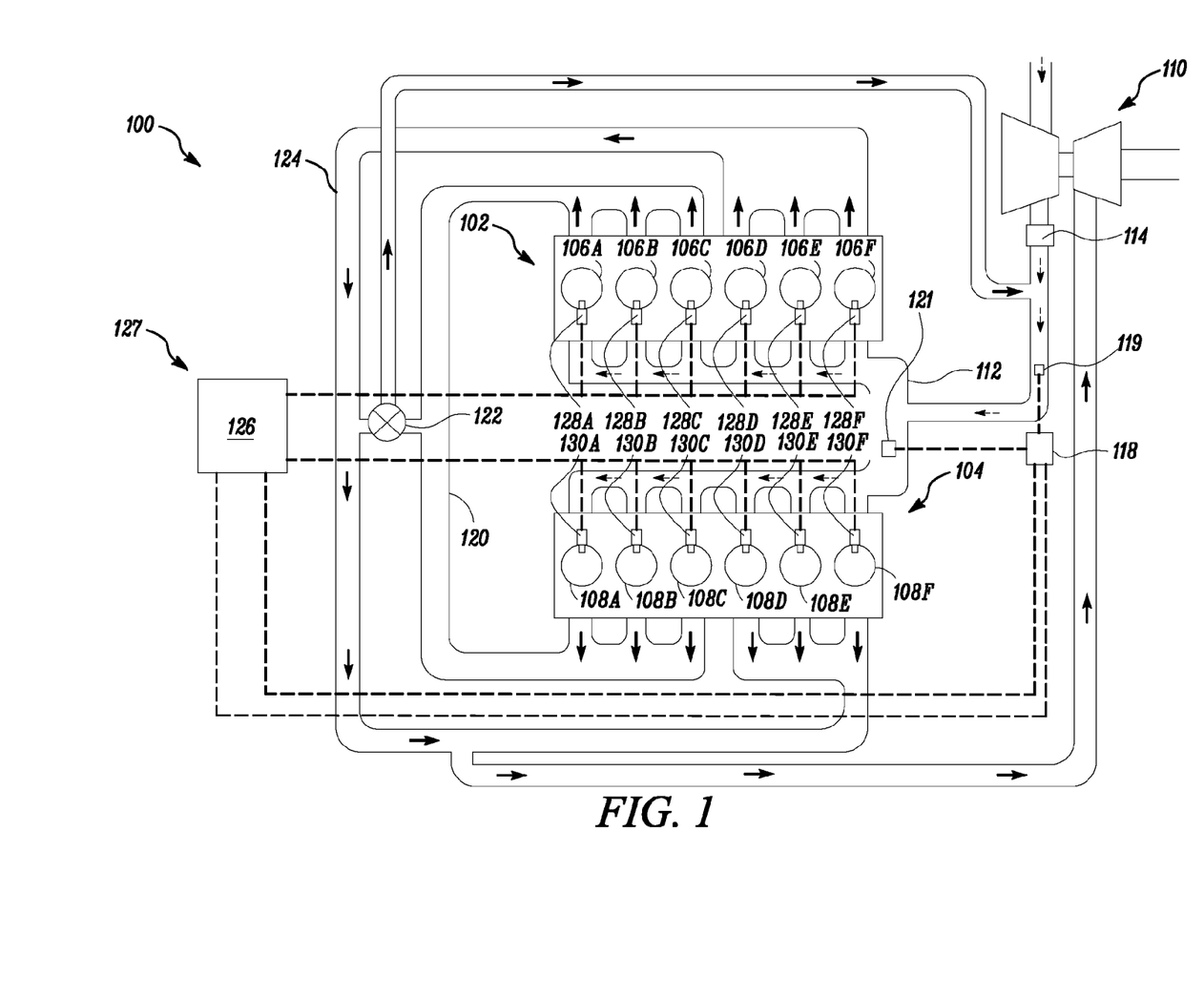
FIG. 1 is an exemplary engine, according to an embodiment of the present disclosure.

FIG. 1 is a schematic representation of an exemplary engine 100. The engine 100 may be an internal combustion engine which runs on diesel, gasoline, gaseous fuels, or a combination thereof. The engine 100 may run various types of machines, such as excavating machines, passenger vehicles, electric generators, mining trucks, marine vessels, agricultural machines, and the like.

The engine 100 shown in the embodiment of FIG. 1 is a V-type engine with a first cylinder bank 102 and a second cylinder bank 104. Each of the first cylinder bank 102 and the second cylinder bank 104 includes six cylinders 106A, 106B, 106C, 106D, 106E, 106F, and 108A, 108B, 108C, 108D, 108E, 108F, respectively. While the engine 100 shown in FIG. 1 is a V-type engine, the engine 100 may be of any other configuration such as inline, radial or the like.

It should also be noted that the number of cylinders, the number of cylinder banks, and their arrangements in the engine 100 are not restricted to the above configuration. Fuel injectors 128A to 128F and 130A to 130F are associated with the respective cylinders 106A to 106F, and 108A to 108F. The fuel injectors, collectively referred to as the injectors 128 and 130, may be configured to supply fuel to the respective cylinders (collectively referred to as the cylinders 106 and 108) in order to facilitate combustion therein.

As shown in FIG. 1, the engine 100 includes a turbocharger 110 fluidly coupled to an intake manifold 112 of the engine 100. The turbocharger 110 may be configured to receive and compress intake air via a compressor (not shown). The compression of intake air may result in an increase in temperature of intake air.

A charge air cooler 114 is positioned downstream of the turbocharger 110 and is configured to cool intake air received from the turbocharger 110. In one embodiment, the turbocharger 110 may be a multi-stage turbocharger configured with one or more inter-coolers (not shown). Further, the engine 100 may include a temperature module 118. The temperature module 118 may be configured to determine at least one of a temperature of intake air at an outlet of the charge air cooler 114 and a temperature of intake air in the intake manifold 112. The temperature of intake air is hereinafter referred to as "the intake air temperature T". In an example, the temperature module 118 may check if a sensor 119 configured to measure the temperature at the outlet of the charge air cooler 114 is functioning properly. The temperature module 118 may then determine the intake air temperature T as the temperature at the outlet of the charge air cooler 114. However, if the sensor 119 is absent or is faulty, the temperature module 118 may check if a sensor 121, configured to measure the temperature of intake air in the intake manifold 112, is functioning properly. The temperature module 118 may then determine the intake air temperature T as the temperature in the intake manifold 112. Further, if both the sensors 119 and 121 are absent or are faulty, the temperature module 118 may determine the intake air temperature T based on various other parameters, such as an engine speed S1, fuel supply etc. In such cases, the temperature module 118 may utilize one or more lookup tables and/or algorithms to determine the intake air temperature T.

The engine 100 may include an Exhaust Gas Recirculation (EGR) line 120 and an associated EGR valve 122. Additional components (not shown), such as one or more coolers, one or more filters and the like, may be provided in the EGR line 120. The EGR line 120 may be associated with the first cylinder bank 102 and the second cylinder bank 104. In the embodiment shown in FIG. 1, the cylinders 106A, 106B, 106C of the first cylinder bank 102, and cylinders 108A, 108B, 108C of the second cylinder bank 104 are fluidly coupled to the EGR line 120. The cylinders, 106A, 106B, 106C, 108A, 108B, 108C are hereinafter collectively referred to as "the EGR cylinders 106, and 108". Further, an exhaust manifold 124 is fluidly coupled to the first cylinder bank 102, the second cylinder bank 104 and the turbocharger 110. Exhaust gas may be directed from the exhaust manifold 124 to the turbocharger 110 in order to drive a turbine (not shown) of the turbocharger 110. The turbine may be drivably coupled to the compressor. The exhaust manifold 124 may be configured to receive exhaust gas from the cylinders 106D, 106E, 106F, 108D, 108E, 108F and from the EGR line 120. The EGR valve 122 may be regulated to control an amount of exhaust gas to be passed to the exhaust manifold 124 from the EGR line 120. As shown in FIG. 1, recirculated exhaust gas is mixed with intake air downstream of the charge air cooler 114. However, it may be contemplated that recirculated exhaust gas may be mixed with intake air at any alternative location, for example, the intake manifold 112. Further, recirculated exhaust gas may also be introduced to intake air in multiple stages.

A controller 126 may regulate operation of the engine 100 based on various parameters. As shown in FIG. 1, the controller 126 may be communicably coupled to the temperature module 118 to receive a signal indicative of the intake air temperature T. The controller 126 and the temperature module 118 may be part of a control system 127 for the engine 100. The controller 126 may be configured to operate the EGR valve 122 to regulate the flow of exhaust gas through the EGR line 120. The controller 126 may also be configured to activate or deactivate one or more of the EGR cylinders 106, 108 by regulating the respective fuel injectors 128A to 128C and 130A to 130C. The controller 126 may be further configured to determine the engine speed S1. The controller 126 may be communicably coupled to a fuel governor (not shown) of the engine 100. The controller 126 may determine the engine speed S1 based on a fuel supply to the engine 100.

In an embodiment, the controller 126 may be configured to selectively initiate one of a first operating mode M1, a second operating mode M2 and a third operating mode M3 based on at least the intake air temperature T and the engine speed S1. The first operating mode M1 may include increasing the engine speed S1 progressively by an incremental speed value. The first operating mode M1 may also include regulating the EGR valve 122. The second operating mode M2 may include deactivating at least one of the EGR cylinders 106 and 108. The third operating mode M3 may include shutting down the engine 100.

The controller 126 may embody a single microprocessor or multiple microprocessors configured for receiving signals from the components of the controller 126. Numerous commercially available microprocessors may be configured to perform the functions of the controller 126. It should be appreciated that the controller 126 may embody a machine microprocessor capable of controlling numerous machine functions. A person of ordinary skill in the art will appreciate that the controller 126 may additionally include other components and may also perform other functions not described herein.

Figure 2:
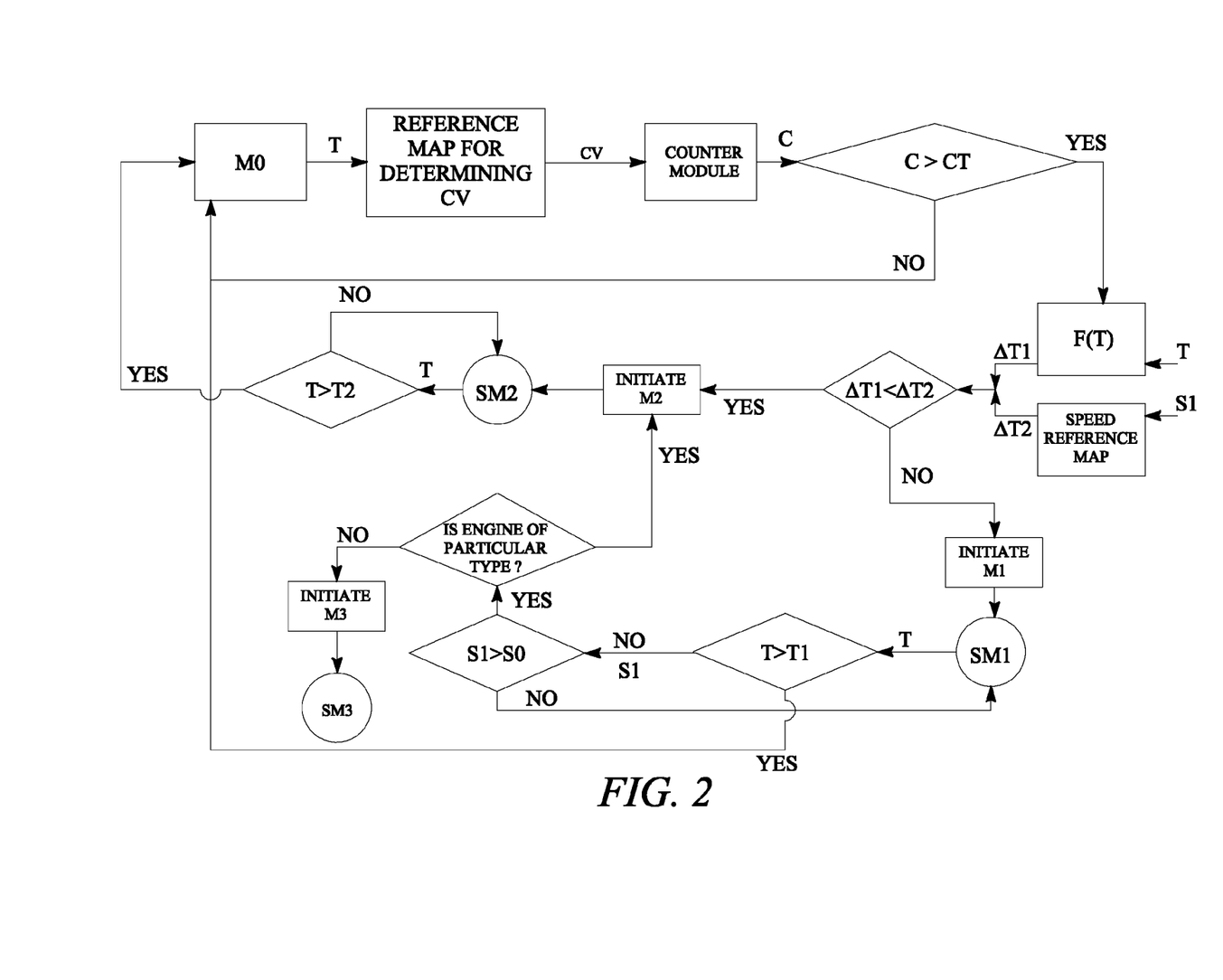
FIG. 2 is a control diagram for operating the engine, according to an embodiment of the present disclosure.

Referring to FIG. 2, the controller 126 may determine a count value CV based on the intake air temperature T received from the temperature module 118. In an embodiment, the controller 126 may determine the count value CV based on the intake air temperature T. Further, the count value CV may be inversely related to the intake air temperature T. For example, the count value CV may have a high value if the intake air temperature T is less than a threshold. Further, the count value CV may have a small positive value or a negative value if the intake air temperature T is higher than the threshold. In an embodiment, the controller 126 may determine the count value CV using a reference map at predefined intervals. The reference map may receive the intake air temperature T as the input and generate the count value CV. The reference map may be stored in a database (not shown) accessible by the controller 126 or an internal memory of the controller 126. The reference map may include a lookup table having predetermined count values CV corresponding to different intake air temperatures T. The reference map may also include one or more mathematical equations. The mathematical equations may include a multiple polynomial regression model, a physics based model, a neural network model or any other model or algorithm known in the art.

Further, the controller 126 may be configured to start a counter C and modify the counter C with the count value CV. In an embodiment, the counter C may be stored in a counter module and periodically incremented by the count value CV. The counter module may also restrict the counter C between a numerical range such that the counter C may remain positive. The controller 126 may also compare the counter C with a preset counter threshold CT. In another embodiment, the controller 126 may also determine an operational mode of the engine 100, such as a work mode, a factory setting mode, an idling mode etc. The controller 126 may be configured to start the counter C only when the engine 100 is in the idling mode. The idling mode may refer to an idling operation of the engine 100, as opposed to the work mode which involves driving of one or more components of the machine.

Subsequently, the controller 126 may selectively initiate any one of the first operating mode M1, the second operating mode M2, and the third operating mode M3 if the counter C is equal to or greater than the preset counter threshold CT. The controller 126 may also reset the counter C after a certain period of time or when any of the first operating mode M1, the second operating mode M2, and the third operating mode M3 is terminated. In one embodiment, the controller 126 may reset the counter C when the operation of the engine 100 is switched between any of the first operating mode M1, the second operating mode M2, and the third operating mode M3. The selective initiation and details of the first, second and third operating modes M1, M2, M3 will be described hereinafter with reference to FIGS. 2 to 5.

In an embodiment, the controller 126 may receive the intake air temperature T from the temperature module 118. The controller 126 may then determine a first temperature parameter $\Delta T1$ as a function of the intake air temperature T. The function may include a reference map, a lookup table or a mathematical equation. In one embodiment, the controller 126 may calculate the first temperature parameter $\Delta T1$ as a difference between the intake air temperature T and a first reference temperature.

The controller 126 is also configured to determine a second temperature parameter $\Delta T2$ based on the engine speed S1. In one embodiment, the controller 126 may refer to a predetermined reference map, a lookup table or a mathematical equation to determine the second temperature parameter $\Delta T2$. In another embodiment, the second temperature parameter $\Delta T2$ may be calculated as a difference between a temperature corresponding to the engine speed S1 and a second reference temperature. The second reference temperature corresponding to the engine speed S1 may be a temperature required for safe operation of the engine 100 for that particular engine speed S1.

Subsequently, the controller 126 compares the first temperature parameter $\Delta T1$ with the second temperature parameter $\Delta T2$. The controller 126 may initiate the first operating mode M1, if the first temperature parameter $\Delta T1$ is greater than the second temperature parameter $\Delta T2$. Under the circumstances where the first temperature parameter $\Delta T1$ is less than the second temperature parameter $\Delta T2$, the controller 126 may be configured to initiate one of the second operating mode M2 and the third operating mode M3.

Figure 3:
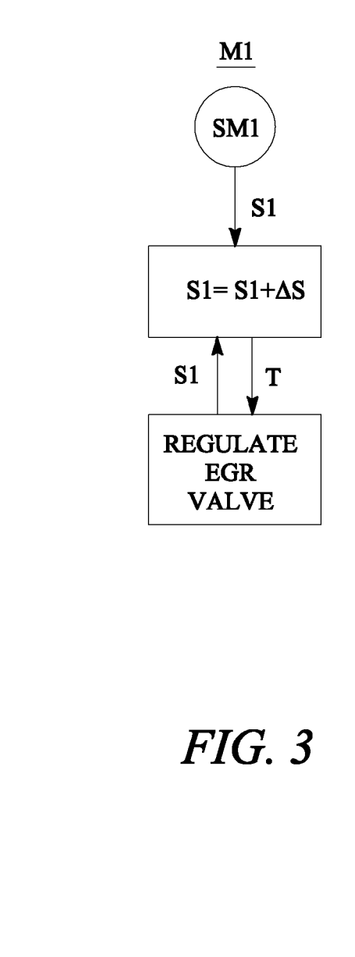
FIG. 3 is a control diagram of a first operating mode, according to an embodiment of the present disclosure.

In the first operating mode M1, as shown in FIG. 3, the controller 126 may increase the engine speed S1 progressively by an incremental speed value $\Delta S$. The controller 126 may increase the engine speed S1 by regulating a fuel supply to the engine 100. The controller 126 may monitor the engine speed S1 and regulate the fuel supply accordingly until the increment $\Delta S$ in the engine speed S1 is obtained. For example, a closed loop speed control may be employed to manipulate the fuel supply to achieve the increment $\Delta S$ in the engine speed S1. The incremental speed value $\Delta S$ may be determined based on the intake air temperature T, type of the engine 100 etc. In an embodiment, the engine speed S1 may be increased by a predetermined value in regular intervals. In an alternative embodiment, the engine speed S1 may be increased at time intervals which are dynamically calculated as a function of the intake air temperature T. For example, the time interval between two speed increments may increase if the intake air temperature T displays an increasing trend. Moreover, the controller 126 may check the intake air temperature T after each increment of the engine speed S1. In a case when the intake air temperature T shows an increase, the incremental speed value $\Delta S$ may be decreased. Further, the controller 126 may determine the current intake air temperature T after a time delay from the increment in the engine speed S1.

Further, in the first operating mode M1, the controller 126 may be configured to also regulate an opening or closing of the EGR valve 122 based on at least one of a temperature of a coolant in an EGR cooler (not shown) and the intake air temperature T. The EGR cooler may be configured to cool exhaust gas before mixing of exhaust gas with intake air. The controller 126 may also compare the temperature of the coolant with a coolant temperature threshold. If the temperature of the coolant is less than the coolant temperature threshold, opening of the EGR valve 122 may further decrease the intake air temperature T. Accordingly, the controller 126 may fully or partially close the EGR valve 122. However, if the temperature of the coolant is greater than the coolant temperature threshold, then opening the EGR valve 122 may warm the intake air because of mixing of hot exhaust gas with intake air. Accordingly, the controller 126 may fully or partially open the EGR valve 122. In another embodiment, the controller 126 may regulate the opening or closing of the EGR valve 122 based on a predetermined relationship between at least the intake air temperature T, the temperature of the coolant and the amount of exhaust gas recirculated to the intake manifold 112 in order to increase the intake air temperature T. In the first operating mode M1, the controller 126 may increase the engine speed S1 and regulate the EGR valve 122 simultaneously or sequentially.

The controller 126 may continuously monitor the current intake air temperature T along with the increased engine speed S1. If the intake air temperature T remains above a first temperature threshold T1 for a preset time period, the controller 126 may terminate the first operating mode M1. The controller 126 may then operate the engine 100 in a normal operating mode M0. The normal operating mode M0 may correspond to an idling operation of the engine 100. The first temperature threshold T1 may be a minimum allowable intake air temperature T corresponding to the idling operation of the engine 100 in the normal operating mode M0. In one embodiment, the controller 126 may determine the first temperature threshold T1 by referring to a predetermined reference map or a lookup table.

However, if the current intake air temperature T is less than the first temperature threshold T1, the controller 126 compares the increased engine speed S1 with a preset speed limit S0. The preset speed limit S0 may be a maximum allowable speed for the engine 100. The maximum allowable speed is a speed limit set to protect the engine 100 from damage. The controller 126 continues to operate the engine 100 in the first operating mode M1 if the increased engine speed S1 is less than the preset speed limit S0. However, if an increased engine speed S1 exceeds the preset speed limit S0, the controller 126 switches to one of the second operating mode M2 and the third operating mode M3 from the first operating mode M1.

In an embodiment, the selection of the second operating mode M2 and the third operating mode M3 is based on the type of the engine 100. The controller 126 may be configured to switch to the third operating mode M3 if the engine 100 is not compatible with the second operating mode M2. In an alternative embodiment, the controller 126 may be configured to switch to the third operating mode M3 if the intake air temperature T is below a low temperature threshold. The low temperature threshold is a minimum allowable intake air temperature T below which the engine 100 may not be safely operated in any one of the first operating mode M1, the second operating mode M2, or the normal operating mode M0.

Figure 5:
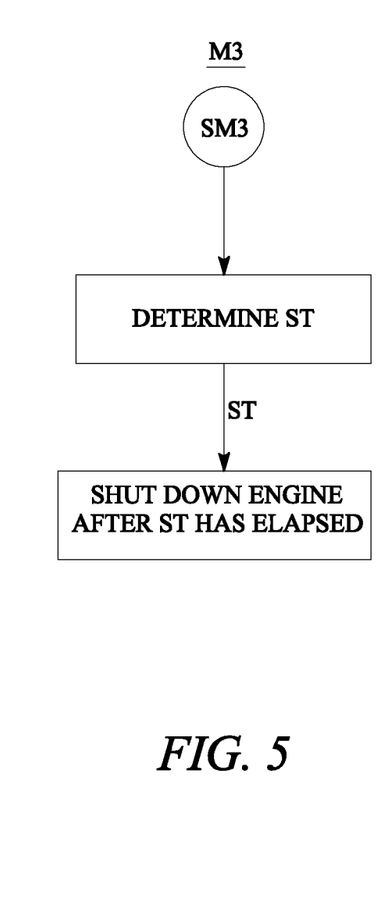
FIG. 5 is a control diagram of a third operating mode, according to an embodiment of the present disclosure.

In the third operating mode M3, the controller 126 may shut down the engine 100. Referring to FIG. 5, in one embodiment, the controller 126 may be configured to determine a shut down time ST based on the intake air temperature T. For very low intake air temperatures T, the shutdown time ST may be low. Accordingly, the controller 126 may generate a request or a flag to shut down the engine 100 after the shutdown time ST has elapsed.

Figure 4:
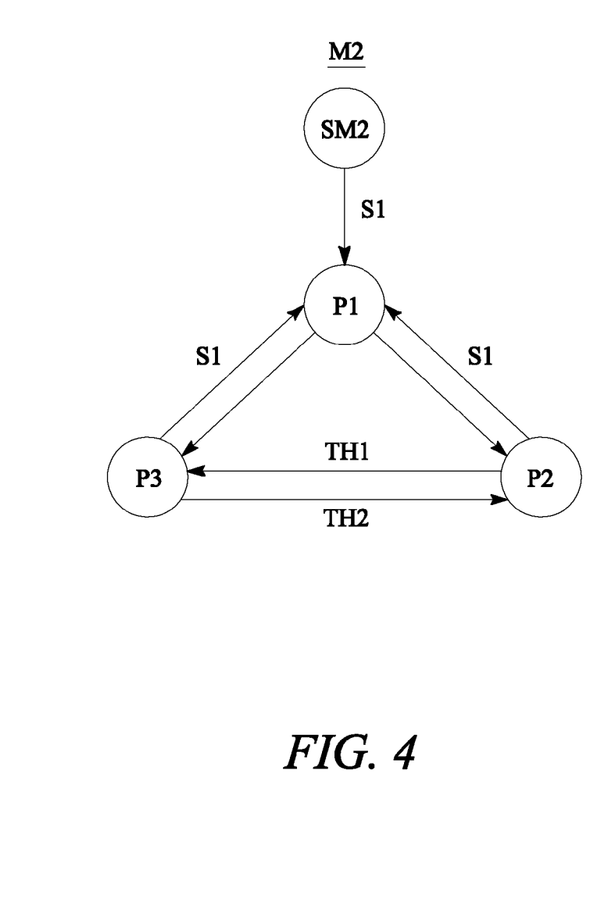
FIG. 4 is a control diagram of a second operating mode, according to an embodiment of the present disclosure.

The controller 126 may be configured to switch to the second operating mode M2 if the engine 100 is compatible with the second operating mode M2 (shown in detail in FIG. 4). In an example, V-type engines may be compatible with the second operating mode M2. Once the second operating mode M2 is initiated, the controller 126 may check if the current engine speed S1 is set to a preset speed SP. The preset speed SP may be a speed at which the engine 100 may operate stably, for example, an elevated idle speed. The elevated idle speed may be greater than an idling speed for the engine 100 but less than a minimum speed of the engine 100 in a work mode. The operation of the engine 100 at the preset speed SP with all the cylinders 106 and 108 firing may be referred to as a first state P1 of the engine 100. After reaching the first state P1, the controller 126 may be configured to deactivate at least one of the EGR cylinders 106 and 108. The operation of the engine 100 with one or more of the EGR cylinders 106 and 108 in deactivated condition may be referred to as a second state P2 of the engine 100. The controller 126 may also be configured to activate at least one of the deactivated EGR cylinders 106 and 108 when a duration of deactivation exceeds a first preset time TH1. The operation of the engine 100 with one or more of the EGR cylinders 106 and 108 in activated condition may be referred to as a third state P3 of the engine 100. Further, the controller 126 may subsequently deactivate at least one of the active EGR cylinders 106 and 108 after a duration of activation exceeds a second preset time TH2. The first and second preset times TH1 and TH2 may be equal or different. In an embodiment, the controller 126 may activate and/or deactivate all the EGR cylinders 106 and 108 in a sequential manner. The controller 126 may deactivate the EGR cylinders 106 and 108 by switching off the respective fuel injectors 128 and 130. Similarly, the controller 126 may activate the EGR cylinders 106 and 108 by switching on the respective fuel injectors 128 and 130, respectively. The sequence of activation and/or deactivation of the EGR cylinders 106 and 108 may be based on an activation/deactivation map. The sequence of activation and/or deactivation may provide a smooth transition between the second and third states P2, P3. The activation/deactivation map may include a sequence of activation and/or deactivation of the EGR cylinders 106, 108 and time delays between two consecutive activations and/or deactivations. In case all the EGR cylinders 106 and 108 are deactivated, recirculation of exhaust gas into the intake manifold 112 may cease completely. As a result, no moisture from exhaust gas is introduced into the intake manifold 112. Therefore, possibility of ice formation in the intake manifold 112 at a low value of the intake air temperature T may be reduced.

In an embodiment, the controller 126 may switch from the second and third states P2 and P3 to the first state P1 based on various parameters, such as the engine speed S1 and status of the fuel injectors 128 and 130 etc. For example, the controller 126 may switch to the first state P1 if the engine speed S1 goes outside a predetermined range, and/or if the controller 126 detects faults in one or more of the fuel injectors 128 and 130. Further, the controller 126 may again switch from the first state P1 to one of the second and third states P2, P3 if the engine speed S1 comes within the predetermined range, and the number of faults in the injectors 128 and 130 comes below a permissible limit. The various conditions for switching between the first, second and third states P1, P2 and P3, as described above, are purely exemplary, and there may be additional conditions which may trigger the transitions. The switching between the first, second and third states P1, P2 and P3 may prevent operation of the engine 100, with the EGR cylinders 106 and 108 in deactivated state, for an indefinite period. Thus, the second operating mode M2 may be run for an extended duration.

The controller 126 may monitor the intake air temperature T during the running of the second mode M2. The controller 126 may further compare the current intake air temperature T with a second temperature threshold T2. The second temperature threshold T2 is a temperature corresponding to the current engine speed S1 for safe operation of the engine 100 in at least one of the idling mode M0 or the first operating mode M1. If the current intake air temperature T remains above a second temperature threshold T2 for a preset time period, the controller 126 may terminate the second operating mode M2 and return to the normal operating mode M0. In an embodiment, the controller 126 may switch to the first operating mode M1 from the second operating mode M2, if the current intake air temperature T is greater than the second temperature threshold T2 but less than the first temperature threshold T1 (the exit temperature threshold for the first mode M1). However, if the current intake air temperature T is less than the second temperature threshold T2, the controller 126 may continue to operate the engine 100 in the second operating mode M2. In one embodiment, the controller 126 may switch to the third operating mode M3 from the second operating mode M2, if the intake air temperature T is less than the low temperature threshold (the shutdown temperature threshold).

INDUSTRIAL APPLICABILITY

Long idling durations of the engine in cold ambient conditions may lead to ice formation in the engine. Further, combustion may be impaired and various components of the engine may not function optimally.

The present disclosure is related to the control system 127 of the engine 100. The controller 126 of the control system 127 is configured to selectively initiate at least one of the first, second and third operating modes M1, M2 and M3 of the engine 100 based on at least the intake air temperature T and the engine speed S1. The control system 127 may utilize the sensors 119 and 121 already installed within the engine 100 without the need for additional sensors. Further, the controller 126 is communicably coupled to the temperature module 118 of the control system 127. The temperature module 118 is configured to determine the intake air temperature T. The control system 127 may increase the intake air temperature T by selectively running the engine 100 in the first operating mode M1. Further, the control system 127 may decrease a moisture content in the intake manifold 112 by selectively running the engine 100 in the second operating mode M2. The control system 127 may also selectively initiate the third operating mode M3 to shut down the engine 100 in order to prevent any damage and/or failure of the engine 100. The various disclosed exemplary embodiments provide the flexibility to control engine operations in a manner that significantly reduces or eliminates engine intake icing caused by moisture accumulating in the intake manifold under extreme cold temperature conditions during idle operations of variable duration.

Figure 6:
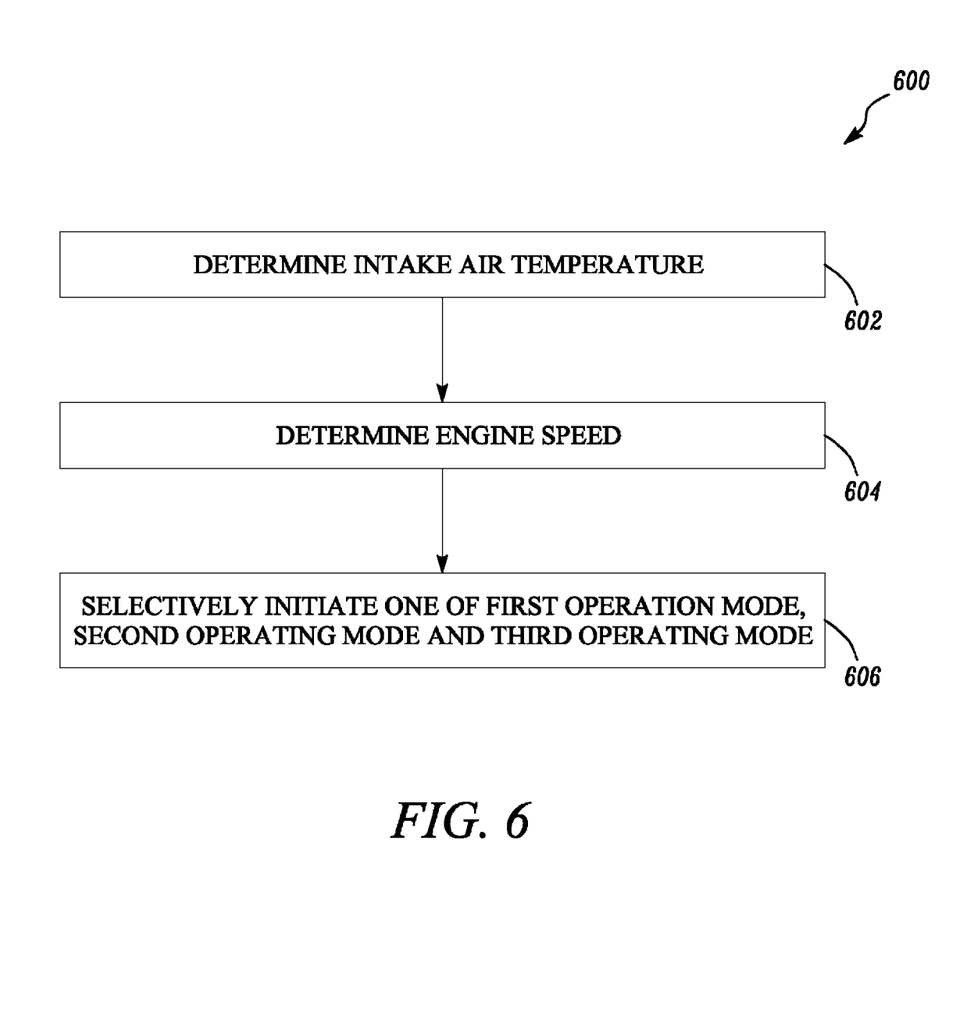
FIG. 6 is a flowchart of a method of operating the engine, according to an embodiment of the present disclosure.

The present disclosure also relates to a method 600 for controlling the engine 100. Referring to FIG. 6, a flowchart of the method 600 is illustrated. At step 602, the controller 126 determines the intake air temperature T. At step 604, the controller 126 determines the engine speed S1. At step 604, the controller 126 selectively initiates one of the first operating mode M1, the second operating mode M2 and the third operating mode M3. The controller 126 may determine the count value CV based on the intake air temperature T at predefined intervals. The controller 126 may modify the counter C by the count value CV. The controller 126 may then initiate one of the first operating mode M1, the second operating mode M2 and the third operating mode M3 if the counter C is equal to or greater than the preset counter threshold CT.

The controller 126 may further determine the first temperature parameter ΔT1 based on the intake air temperature T. The controller 126 may also determine the second temperature parameter ΔT2 based on the engine speed S1. The controller 126 may initiate the first operating mode M1 if the first temperature parameter ΔT1 is greater than or equal to the second temperature parameter ΔT2. The controller 126 may initiate the second operating mode M2 if the first temperature parameter ΔT1 is less than the second temperature parameter ΔT2.

In the first operating mode M1, the engine speed S1 may be increased progressively by the incremental speed value ΔS. Further, the EGR valve 122 may also be regulated in the first operating mode M1 based on at least the intake air temperature T. The first operating mode M1 may be terminated if the intake air temperature T remains above the first threshold temperature T1 for the preset time period. The method 600 may further include switching from the first operating mode M1 to one of the second and third operating modes M2, M3 if the increased engine speed S1 exceeds the preset speed limit S0. Selection between the second and third operating modes M2, M3 may be based on the type of the engine 100. In the second operating mode M2, at least one of the EGR cylinders 106 and 108 is deactivated. The deactivated EGR cylinders 106 and 108 are activated when the duration of deactivation exceeds the first preset time TH1. Further, the activated EGR cylinders 106 and 108 are deactivated when the duration of activation exceeds the second preset time TH2. The second operating mode M2 further includes setting the engine speed S1 to the preset speed SP. The second operating mode M2 is terminated if the intake air temperature T exceeds the second threshold temperature T2. The third operating mode M3 may include shutting down the engine 100. The shutdown time ST may be determined based on the intake air temperature T. Further, the engine is shut down after the shutdown time ST has elapsed.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for operating an engine, the method comprising:
   determining an intake air temperature;
   determining an engine speed;
   determining a first temperature parameter based on the intake air temperature;
   determining a second temperature parameter based on the engine speed;
   initiating a first operating mode of the engine in response to the first temperature parameter being greater than or equal to the second temperature parameter;
   comparing the intake air temperature to a first threshold temperature;
   comparing the engine speed to a threshold engine speed;
   transitioning the engine from the first operating mode to a second operating mode in response to
      the intake air temperature being less than the first threshold temperature, and
      the engine speed being greater than the threshold engine speed,
   wherein the first operating mode comprises progressively increasing the engine speed by an incremental speed value, and
   wherein the second operating mode comprises shutting down the engine.

2. The method of claim 1, wherein the first operating mode further comprises:
   determining an exhaust gas recirculation (EGR) coolant temperature;
   comparing the EGR coolant temperature to a threshold coolant temperature; and
   increasing an EGR flow to the engine by operating an EGR valve in response to the EGR coolant temperature being greater than the threshold coolant temperature.

3. The method of claim 1, further comprising terminating the first operating mode if the intake air temperature remains above the first threshold temperature for a preset time period.

4. The method of claim 1, wherein the second operating mode further comprises:
   determining a shutdown time based on the intake air temperature; and
   shutting down the engine after the shutdown time has elapsed.

5. The method of claim 1, further comprising
   initiating a third operating mode of the engine in response to the first temperature parameter being less than the second temperature parameter,
   wherein the third operating mode includes reducing an exhaust gas recirculation (EGR) flow to the engine.

6. The method of claim 5, further comprising:
   determining a count value based on the intake air temperature at predefined intervals;

modifying a counter by the count value; and initiating one of the first operating mode, the second operating mode, and the third operating mode in response to the counter being equal to or greater than a preset counter threshold.

7. The method of claim 5, wherein the reducing the EGR flow to the engine during the third operating mode includes deactivating an EGR cylinder of the engine.

8. The method of claim 7, wherein the third operating mode further includes:

activating the EGR cylinder when a duration of EGR cylinder deactivation exceeds a first preset time, and deactivating the EGR cylinder when a duration of EGR cylinder activation exceeds a second preset time.

9. The method of claim 5, wherein the third operating mode further includes setting the engine speed to a preset speed.

10. The method of claim 5, further comprising terminating the third operating mode in response to the intake air temperature exceeding a second threshold temperature.

11. A method for operating an engine, the method comprising:

determining an intake air temperature;

determining an engine speed;

determining a first temperature parameter based on the intake air temperature;

determining a second temperature parameter based on the engine speed;

initiating a first operating mode of the engine in response to the first temperature parameter being greater than or equal to the second temperature parameter; and initiating a second operating mode of the engine in response to the first temperature parameter being less than the second temperature parameter, wherein the first operating mode comprises progressively increasing the engine speed by an incremental speed value, and wherein the second operating mode comprises reducing an exhaust gas recirculation (EGR) flow to the engine.

12. The method of claim 11, further comprising:

determining a count value based on the intake air temperature at predefined intervals;

modifying a counter by the count value; and initiating one of the first operating mode and the second operating mode in response to the counter being equal to or greater than a preset counter threshold.

13. The method of claim 11, wherein the first operating mode further comprises:

determining an EGR coolant temperature;

comparing the EGR coolant temperature to a threshold coolant temperature; and increasing an EGR flow to the engine by operating an EGR valve in response to the EGR coolant temperature being greater than the threshold coolant temperature.

14. The method of claim 11, further comprising terminating the first operating mode in response to the intake air temperature remaining above a first threshold temperature for a preset time period.

15. The method of claim 14, further comprising terminating the second operating mode in response to the intake air temperature exceeding a second threshold temperature.

16. The method of claim 11, further comprising:

comparing the intake air temperature to a first threshold temperature;

comparing the engine speed to a threshold engine speed; and transitioning the engine from the first operating mode to a third operating mode in response to the intake air temperature being less than the first threshold temperature, and the engine speed being greater than the threshold engine speed, wherein the third operating mode comprises shutting down the engine.

17. The method of claim 16, further comprising transitioning the engine from the first operating mode to one of the second operating mode and the third operating mode in response to the engine speed exceeding a preset speed limit, wherein selection between the second operating mode and the third operating mode is based on whether the engine has an EGR cylinder capable of deactivation.

18. The method of claim 16, wherein the third operating mode further comprises:

determining a shutdown time based on the intake air temperature; and shutting down the engine after the shutdown time has elapsed.

19. The method of claim 11, wherein the reducing the exhaust gas recirculation (EGR) flow to the engine during the second operating mode includes deactivating an EGR cylinder of the engine.

20. A control system for an engine, the control system comprising:

a temperature module configured to determine an intake air temperature; and a controller communicably coupled to the temperature module, wherein the controller is configured to receive the intake air temperature from the temperature module, determine an engine speed, determine a first temperature parameter based on the intake air temperature, determine a second temperature parameter based on the engine speed, initiate a first operating mode of the engine in response to the first temperature parameter being greater than or equal to the second temperature parameter, initiate a second operating mode of the engine in response to the first temperature parameter being less than the second temperature parameter, progressively increase the engine speed by an incremental speed value during the first operating mode, and decrease an exhaust gas recirculation flow to the engine during the second operating mode.

* * * * *